United States Patent
Matsuda et al.

(10) Patent No.: US 6,413,373 B1
(45) Date of Patent: Jul. 2, 2002

(54) PROCESS FOR PRODUCING SILICA PARTICLES SUITABLE FOR USE AS FILLER FOR PAPER

(75) Inventors: Masashi Matsuda, Yokohama; Masasuke Watanabe, Kawasaki; Hitoshi Okada; Motohide Wada, both of Tokyo; Osamu Kitao, Yokohama, all of (JP)

(73) Assignee: OJI Paper Co., Ltd., Tokyo (JP)

( * ) Notice: Subject to any disclaimer, the term of this patent is extended or adjusted under 35 U.S.C. 154(b) by 0 days.

(21) Appl. No.: 09/832,849

(22) Filed: Apr. 12, 2001

Related U.S. Application Data

(62) Division of application No. 09/266,575, filed on Mar. 11, 1999, now Pat. No. 6,264,907.

(30) Foreign Application Priority Data

| Mar. 12, 1998 | (JP) | 10-061166 |
| Apr. 16, 1998 | (JP) | 10-121636 |
| Apr. 24, 1998 | (JP) | 10-129697 |

(51) Int. Cl.$^7$ .................. D21H 17/68; D21H 21/10
(52) U.S. Cl. .................. 162/181.6; 162/181.7; 423/335; 501/133; 501/405
(58) Field of Search .................. 502/233, 405; 106/482; 423/335; 427/397.7; 162/181.6, 181.7

(56) References Cited

U.S. PATENT DOCUMENTS

| 5,024,826 A | 6/1991 | Linton |
| 5,336,477 A | 8/1994 | Koga et al. |
| 5,695,730 A | 12/1997 | Maejima et al. |

FOREIGN PATENT DOCUMENTS

| JP | 5-301707 | 11/1993 |
| JP | 5-311599 | 11/1993 |
| JP | 6-166987 | 6/1994 |
| JP | 8-91820 | 4/1996 |
| JP | 2604316 | 1/1997 |
| JP | 2710529 | 10/1997 |
| WO | WO 97/40105 | 10/1997 |

OTHER PUBLICATIONS

Patent Abstracts of Japan, vol. 18, No. 101 (C–1168), Feb. 18, 1994, JP 05–301707, Nov. 16, 1993.
Patent Abstracts of Japan, vol. 015, No. 353 (C–0865), Sep. 6, 1991, JP 03–139537, Jun. 13, 1991.
Patent Abstracts of Japan, vol. 097, No. 11, Nov. 28, 1997, JP 09–176988, Jul. 18, 1997.

Primary Examiner—Peter Chin
(74) Attorney, Agent, or Firm—Oblon, Spivak, McClelland, Maier & Neustadt, P.C.

(57) ABSTRACT

The present invention relates to a process for easily and efficiently producing silica particles having a narrow particle size distribution and a high porosity from inexpensive starting materials such as sodium silicate. The silica particles of the present invention can be obtained in the form of a slurry containing them by (1) forming a slurry by mixing first particles difficultly soluble in an alkali and soluble in an acid, with an aqueous alkali silicate solution to form a first slurry containing the first particles, (2) neutralizing the first slurry with a mineral acid to prepare a second slurry containing second particles wherein silica is deposited on the first particles, and (3) adding a mineral acid to the second slurry to dissolve the first particles from the second particles, to prepare a third slurry containing silica particles. When the silica particles of the present invention are used as a filler even in a small amount for paper making, the resultant papers have excellent brightness, opacity, opacity-after-printing, etc.

13 Claims, No Drawings

PROCESS FOR PRODUCING SILICA PARTICLES SUITABLE FOR USE AS FILLER FOR PAPER

This application is a Division of application Ser. No. 09/266,575 Filed on Mar. 11, 1999, U.S. Pat. No. 6,264,900.

TECHNICAL FIELD OF THE INVENTION

The present invention relates to porous silica particles particularly suitable for use as a filler for papers, a process for producing them and the use thereof for producing filler-containing papers.

TECHNICAL BACKGROUND OF THE INVENTION

Papers used for printing or writing usually contain, as fillers, inorganic particles of silica, hydrous silicic acid, talc, calcium carbonate, clay, kaolin, titanium dioxide, etc. and organic particles of urea/formaldehyde polymers or the like for improving the optical properties such as opacity and brightness, smoothness, touch, printability, writing suitability, etc.

Papers containing the above-described fillers are produced by adding the fillers and other assistants usually used for making paper, to paper pulp dispersed in water, forming a wet paper from the obtained stuff with a Fourdrinier paper making machine, twin-wire paper-making machine or the like and drying it.

Recently, the thickness of the paper sheets tends to be reduced to reduce the basis weight thereof. However, particularly when printing paper sheets are reduced in weight, the opacity of the printed paper (hereinafter referred to as "opacity-after-printing") is reduced to cause a problem that the printed letters on the reverse side of the paper sheets are seen through the paper from the surface of the paper.

Various fillers are usually added to the papers for the purpose of improving the opacity (including the opacity-after-printing) of the papers.

Although investigations have been conducted for the purpose of developing inorganic and organic fillers for improving the opacity, inexpensive fillers having an excellent effect of improving the opacity have not yet been developed. Further, since the tendency to the further reduction in weight is recently increasing, the development of a filler having a higher power of improving the opacity than that of ordinary fillers is eagerly demanded.

Among the fillers currently used for improving the opacity, titanium dioxide has only a low power of inhibiting the penetration of inks, while it is capable of improving the opacity of white papers. Therefore, the improvement in opacity-after-printing is impossible when titanium dioxide is used. Further, under such conditions that the maximum light scattering capacity can be exhibited, the retention of titanium oxide in the paper is uneconomically very low.

Although organic urea/formalin resins have effects of improving both opacity-after-printing and opacity of white paper (opacity before printing), each absolute effect is insufficient.

Hydrous silicic acid is less expensive than the other fillers and it is relatively effective in imparting the opacity-after-printing to a paper by inhibiting the penetration of inks when it is added to a pulp and the paper is made therefrom. However, its effects including that of improving the opacity of white paper have not yet reached the expected level.

As for hydrous silicic acid, it is known that the oil absorption, which is an index of the capacity of preventing ink from the penetration and greatly contributes to the improvement in the opacity-after-printing, is increased in proportion to the specific surface area of hydrous silicic acid and can be controlled by changing the hydrous silicic acid synthesis conditions.

However, when the specific surface area of hydrous silicic acid is increased to a level higher than that of the ordinary one and the paper is dried under the same conditions as the paper-making conditions, the filler itself is shrunk to reduce the oil absorption and, as a result, the improvement in the opacity-after-printing is reduced.

Amorphous silica particles disclosed in Japanese Patent No. 2,604,316 have a high oil absorption and not so large specific surface area. However, the effect thereof on the opacity obtained by adding these particles to paper is not significantly different from that by adding hydrous silicic acid commonly used at present.

Japanese Patent Unexamined Published Application (hereinafter referred to as "J. P. KOKAI") No. Hei 5-301707 discloses hydrous silicic acid of the formula: $SiO_2.nH_2O$ (wherein n is a positive integer) wherein the cumulative volume is 1.9 to 4.0 cc/g for pores having a pore radius in the range of $5 \times 10^4$ Å or less, that is at least 0.5 cc/g for pores having a pore radius in the range of 3,000 to $4 \times 10^4$ Å, and that is at least 0.6 cc/g for pores having a pore radius in the range of 100 to 1,000 Å. However, the absolute volume for the pores is small because the cumulative volume of pores having a pore radius of $5 \times 10^4$ Å or smaller is up to 4.0 cc/g. In addition, the cumulative volume of the pores having a pore radius of 3,000 to $4 \times 10^4$ Å and capable of absorbing the pigment in the ink and also that of the pores having a pore radius of 100 to 1,000 Å and capable of absorbing the vehicle in the ink are yet below the necessary levels.

Japanese Patent No. 2,710,529 discloses a hydrous silicic acid filler for paper making, which is fine, amorphous hydrous silicic acid obtained by the neutralization reaction of an aqueous sodium silicate solution in the absence of alkali metal salts, and which contains at least amorphous magnesium silicate as a fine, amorphous metal compound. However, when the amorphous metal compound content is increased for improving the opacity, the oil absorption is reduced to impair the power of inhibiting the penetration of the ink and, as a result, the improvement in the opacity-after-printing is unsatisfactory.

The diameters of primary particles usually and widely used are very small. Although the particle diameters are relatively uniform, they are not in the form of the primary particles, but they form aggregates as secondary particles in most cases, and the particle diameter distribution is usually wide when the particles are used. In addition, even when the average particle size is almost equal, the state of the distribution is different. It is known that when particles of a small diameter are thoroughly dispersed in a paper, the contribution of the particles on the optical properties of the paper is greater than that of particles of a large diameter or a small diameter retained in the paper with a reagent such as a retaining improver.

However, the particle size of the filler used ranges in a wide range as described above. When such a filler of various particle sizes is added to a paper-making pulp and a paper is made therefrom, the retaining rate (or retention) of the particles of small sizes is usually and seriously low, though it varies depending on the paper-making machine. For improving the optical properties, the addition rate of the filler must be increased. However, the improvement in the optical properties by merely increasing the addition rate is limited because when the addition rate of the filler is increased, the strength of the paper is lowered. On the other hand, although the particles of a large size are retained in the paper, they also have problems that the specific surface area of them is small and the contribution of them to the optical properties is only slight. Under these circumstances, it is desired to easily obtain a filler having a uniform particle size.

SUMMARY OF THE INVENTION

Therefore, the object of the present invention is to provide a process for easily and efficiently producing silica particles having a high porosity from inexpensive sodium silicate or the like.

Another object of the invention is to provide silica particles capable of imparting excellent brightness, opacity, opacity-after-printing, etc. to a paper obtained by using such particles as a filler in the paper making.

Still another object of the invention is to provide a filler comprising silica particles having an opacity superior to that of another filler when they are used in the same amount.

DETAILED DESCRIPTION OF THE INVENTION

After intensive investigations made for the purpose of attaining the above-described object, the inventors have found that silica particles with a high porosity can be obtained by depositing silica from an aqueous alkali silicate solution on first particles difficultly soluble in an alkali and soluble in an acid to obtain a slurry containing second particles wherein silica is deposited on the first particles and then dissolving the first particles from the second particles with a mineral acid. The present invention has been completed on the basis of this finding. The inventors have also found that the opacity can be improved by narrowing the range of the particle size distribution even when the average particle size is on the same level or, in particular, by using silica particles having a very uniform size and a particle size distribution very close to a single peak. The present invention has been completed on the basis of these findings.

The detailed description will be made an the present invention.

The silica particles of the present invention can be obtained in the form of a slurry thereof by the following steps:

(1) mixing first particles difficultly soluble in alkalis and soluble in acids with an aqueous alkali silicate solution to form a first slurry containing first particles;

(2) neutralizing the first slurry with a mineral acid to prepare a second slurry containing second particles wherein silica is deposited on the first particles; and (3) adding a mineral acid to the second slurry particles to dissolve the first particles from the second particles, to prepare a third slurry containing silica particles.

The silica particles of the present invention have a volume of 4.0 to 6.0 cc/g, preferably 4.0 to 5.5 cc/g, for pores having a diameter of $10^5$ Å or less, and that of 2.0 cc/g or more for pores having a diameter in the range of 6,000 to $8 \times 10^4$ Å, and that of 1.0 cc/g or more for pores having a diameter in the range of 200 to 2,000 Å.

When the volume is less than 4.0 cc/g for the pores having a diameter of is $10^5$ Å or less, the oil absorption is small and the desired opacity-after-printing cannot be easily imparted to the paper. On the contrary, the silica particles having a volume of larger than 6.0 cc/g for the pores having a diameter of $10^5$ Å or less cannot be easily produced. As for the pores having a diameter in the range of 6,000 to $8 \times 10^4$ Å, when the volume of them is less than 2.0 cc/g, a paper-making filler having a high ink absorption cannot be easily obtained because the absorption of a pigment component in the ink, absorbable in the pores having diameters of this range, is poor. When the volume of the pores having a diameter in the range of 200 to 2,000 Å is below 1.0 cc/g, the absorption of the vehicle, among the ink components, is insufficient for obtaining the paper-making filler having excellent ink absorption and effect of preventing strike-through of ink to the reverse side of the paper (hereinafter referred to as "non-strike through effect"). For obtaining a paper having a high ink absorption, the volume of pores having a diameter in the range of 200 to 2,000 Å is desirably 1.0 to 2.0 cc/g.

The pore volume was determined with a mercury porosimeter (type: Poreosizer-9320; a product of Micro Meritics). As for the volume for pores having a diameter of $10^5$ Å or less, that for pores having a diameter of 12 to $10^5$ Å was determined.

The particle size distributions of the first particles and silica particles were determined with a laser diffraction particle size distribution determination device (type: SALD-2000 J; a product of Shimadzu Corporation). This method will be referred to as "laser method" hereinafter.

The oil absorption of the silica particles of the present invention is 300 to 500 ml/100 g, preferably 350 to 500 ml/100 g. When the oil absorption is below 300 ml/100 g, the opacity-after-printing cannot be easily imparted to the paper, and the silica particles having an oil absorption of above 500 ml/100 g cannot be easily produced. The oil absorption was determined according to JIS K 5101.

The bulk specific gravity of the silica particles of the present invention is 0.1 g/ml or below, preferably 0.09 g/ml or less (the lower limit is usually 0.06 g/ml). It is supposed that when the bulk specific gravity of the silica particles is as low as 0.1 g/ml, the volume of these particles in a paper will be large when they are added to the paper to make a large contribution to the ink absorption. When the bulk specific gravity is above 0.1 g/ml, such an effect is difficultly exhibited. The bulk specific gravity was determined according to JIS K 5101.

The average particle diameter as determined by the laser method is 5 to 30 μm, preferably 8 to 25 μm, and the standard deviation of the particle volume distribution to the particle diameter (μm) represented by the logarithm is in the range of 0.1 to 0.25, preferably 0.1 to 0.2.

When the amount of the silica particles in the paper is fixed, the smaller the average particle diameter, the higher the opacity. However, when the average silica particle diameter is lower than 5 μm, a large amount of the particles is necessitated because the retention of the added silica particles in the paper is seriously lowered. Although an inorganic or organic retention aid can be added for the purpose of increasing the retention, the amount thereof is limited because a large amount thereof impairs the formation of the paper. On the contrary, when the particle diameter is larger than 30 μm, the number of the particles contained in the paper is reduced to also reduce the light-scattering effect of the silica particles and thereby to reduce the opacity of the paper, though the retention thereof in the paper is extremely high.

Another characteristic of the silica particles used in the present invention is that the particle diameter distribution can be controlled in such a range that the standard deviation of the particle volume distribution to the particle diameter (μm) represented by logarithm is in the range of 0.1 to 0.25, preferably 0.1 to 0.2. Since the silica particles are in the form of aggregates of single particles as a secondary particles, as described above, they are actually used in the form of a mixture of the aggregates of the particles having small and large particle diameters. Therefore, when they are used as they are, the particles of small diameters are difficultly retained in the water and, on the contrary, although the particles of large diameters are retained in the paper, they do not effectively contribute to the opacity of the paper. When the standard deviation is higher than 0.25, the amount of the particles having small diameters and those having large diameters are increased, and the function of them as the filler is insufficient.

The silica particles having an average particle diameter of 5 to 30 μm as determined by the laser method and a standard deviation of 0.1 to 0.25 for the particle volume distribution to the particle diameter represented by the logarithm are obtained by, if necessary, subjecting the silica particle-containing slurry obtained as described above to a dry or wet pulverization and then classifying the particles into two groups with a vibrating screen or the like.

The characteristic values of the first particles (in case they are determined) and silica particles are those obtained by filtering the slurry containing these particles, washing the particles with water, drying them with a dryer at 105° C. and determining them by the above-described methods.

The detailed description will be made on a suitable method of producing the silica particles of the present invention.

The aqueous alkali silicate solution used in step (1) of the present invention is not particularly limited, and is preferably an aqueous sodium silicate solution or aqueous potassium silicate solution. As for the molar concentration of the alkali silicates in the aqueous solution, that of sodium silicate is selected from a molar ratio of $SiO_2/Na_2O$ in the range of 2.0 to 3.4.

The first particles to be added to the aqueous alkali silicate solution in the present invention are those difficultly soluble in an alkali and soluble in an acid. The expression "difficultly soluble in an alkali" herein indicates that the first particles are not soluble in an aqueous alkali solution of pH 9 or above in a short time, namely in 120 minutes.

The materials for the first particles are not particularly limited so far as the diameter of the particles can be controlled.

The first particles include those of metals, metal salts, metal oxides, metal hydroxides and organic materials. Metals include those metals belonging to Groups 1A to 7A, 8, 1B and 2B of the Periodic Table, such as K, Rb, Mg, Ca, Sr, Ba, Mn, Fe, Co, Ni, Zn, etc. Metal salts include those salts of the metals such as carbonates and manganates, for example, calcium carbonate, barium carbonate, magnesium carbonate, nickel carbonate, potassium manganate, etc. Metal oxides include the oxides of these metals such as magnesium oxide, zinc oxide, calcium oxide, manganese oxide, etc. Metal hydroxides include those hydroxides of the metals such as magnesium hydroxide, calcium hydroxide, manganese hydroxide, etc. These particles may be used singly or as a mixture of two or more of them.

The first particles are mixed with the aqueous alkali silicate solution to obtain a first slurry containing the first particles. The amount of these first particles in the first slurry is usually 5 to 120% by weight, preferably 10 to 60% by weight, based on the solid (in terms of silica) in the aqueous alkali silicate solution.

Various mineral acids are usable for neutralizing the first slurry and thereby to precipitate silica on the first particles. These mineral acids are usable in the form of a mixture of two or more of them. Examples of the mineral acids include hydrochloric acid, sulfuric acid and nitric acid. Sulfuric acid is suitable for use as the mineral acid because it is easily available on the market at a relatively low cost. The concentration of the mineral acid which is not particularly limited is usually 10 to 30% by weight.

The diameter of the first particles is controlled as desired before they are mixed with the aqueous alkali silicate solution. The average particle diameter is in the range of 0.01 to 10 μm, preferably 0.1 to 5 μm. When the average particle diameter is larger than 10 μm, the quantity of the first particles to be contained in the second particles wherein silica is deposited on the first particles is reduced and, therefore, the particles added are wasted. On the contrary, first particles smaller than 0.01 μm in diameter are economically disadvantageous because the production thereof necessitates a high cost and much labor but the effect thereof in improving the brightness and opacity is insufficient. Further, by making the size of the first particles uniform, the particle size distribution of the obtained silica particles of the present invention can be made uniform and to have a single peak.

Various mineral acids are usable for dissolving the first particles in the second particles wherein silica is deposited on the first particles. Mineral acids usable in the present invention are those reactive with the first particles to form salts which are easily removable by washing with water or the like. The mineral acids are usable either alone or in the form of a mixture of two or more of them. The concentration of the mineral acids which is not particularly limited is usually 10 to 30% by weight.

The first particles are usually added to the aqueous alkali silicate solution under stirring the solution, or the aqueous alkali silicate solution may be added to an aqueous slurry of these first particles.

The first particles are added to the aqueous alkali silicate solution in a period ranging from before the addition of the mineral acid for the neutralization to the precipitation of silica by the addition of the mineral acid in case the mineral acid is added only once or two or more times as will be described below. Namely, the order and number of times of the addition of the first particles and the mineral acid for the neutralization are not particularly limited so far as they are added prior to the complete neutralization of the alkali silicate. The addition may be conducted at once, intermittently in small portions or continuously.

The amount of the first particles is preferably 5 to 120% by weight, more preferably 10 to 60% by weight, based on the solid content (in terms of silica) in the aqueous alkali silicate solution. The amount of these first particles in this range is desirable from the viewpoint of the suitableness as the paper-making filler. When the amount of these first particles is smaller than 5% by weight, the obtained silica filler cannot impart the desired brightness and opacity to the paper. On the contrary, even when the amount of these first particles exceeds 120% by weight, the excellent brightness and opacity are no more improved. In such a case, a larger amount of the mineral acid is necessitated for dissolving the first particles, after the completion of the precipitation by neutralization to increase the production cost of the silica filler economically disadvantageously.

When the mineral acid for neutralizing the aqueous alkali silicate solution is added at once in the step (2) of the present invention, the temperature of the first slurry is 60° C. or higher and not above the boiling point of the slurry, preferably 70° C. or higher and not above the boiling point thereof, to form the second particles wherein silica is deposited on the first particles. The mineral acid may be added either at once or continuously.

Although the boiling point of the first slurry is usually equal to the boiling point of the aqueous alkali silicate solution, it may vary depending on ions dissolved therein, the pressure of the system, etc. In practice, the boiling point herein indicates the temperature at which the liquid in the slurry boils. Usually, the boiling point is in the range of 95 to 105° C.

When the mineral acid for neutralizing the aqueous alkali silicate solution is added dividedly in two or more portions, 10 to 50%, preferably 20 to 40%, of the total amount thereof necessitated for neutralizing the aqueous alkali silicate solution is added first at a slurry temperature of 20 to 60° C., preferably 30 to 60° C. Then, the temperature is elevated to a range of 70° C. to the boiling point of the slurry to conduct the aging if necessary. In this step, the above-described amount of the mineral acid can be added at once or continuously to the slurry.

Then, the aqueous alkali silicate solution is heated to a temperature in the range of 70° C. to the boiling point of the slurry, preferably 85° C. to the boiling point of the slurry in a short period of time such as 10 to 30 minutes, and aged, if necessary. Thereafter, the second portion of the mineral acid is added at once or continuously to neutralize the aqueous alkali silicate solution and, further aging is conducted if necessary.

In the step (3) of the present invention, the mineral acid is further added to the second slurry containing the second particles, obtained as described above, to dissolve the first particles from the second particles. The mineral acid used for the dissolution can be added at once, in portions or continuously. The pH of the second slurry containing the second particles is controlled at 2 to 6.5, preferably 4 to 6.

The temperature at which the first particles in the second particles are to be dissolved is not particularly limited. Namely, the dissolution can be conducted after lowering the temperature to, for example, 20° C. or without lowering the temperature.

The amount of the mineral acid to be added in this step is such that the whole first particles are dissolved therein.

In the present invention, an electrolytic substance such as sodium sulfate can be previously added so that the viscosity of the slurry is kept low and stable when the formation and aging of the second particles are accelerated. The term "aging" herein indicates that the slurry is stirred at a predetermined temperature in the range of, for example, 60° C. to the boiling point of the slurry for a predetermined time such as 10 to 180 minutes.

The particle size and distribution were determined with the particle size distribution determination device (Type: SALD-2000 J; a product of Shimazu Corporation). There was no peak due to the first particles in the second particles and no difference was found between the second particles and the silica particles after the dissolution. It was also found that the pore volume after the dissolution was larger than that before the dissolution. From this fact, it is supposed that the second particles contain the first particles therein in the step of forming the second particles, and that by dissolving the first particles with the mineral acid, the porosity of the particles is increased.

Namely, supposedly, silica is deposited on the surfaces of the first particles so that silica surrounds the first particles, at least partially or substantially completely. The silica layer can be apparently continuously deposited or, alternatively, the fine primary particles can be aggregated together to form secondary particles which form the silica layer. Further, after the dissolution of the first particles, a part of these first particles may possibly remain and is adsorbed on the porous silica surfaces.

In the present invention, the silica particles are obtained in the form of a slurry thereof, and well-known means and equipment are usable without any change for the transportation and storage of them. If necessary, the silica particles obtained by the present invention may be subjected to the wet grinding and/or wet classification before they are added to the papers. The means for the wet pulverization include well-known continuous homomixer, colloid mill, disc refiner, sand grinder, ball mill, rod mill, etc. When the silica particles are to be classified after the grinding, they are classified by wet method with a classifying machine such as a well-known vibrating screen to remove coarse particles larger than 70 $\mu$m. The silica particles obtained after the above-described treatment has an average particle diameter in the range of 5 to 30 $\mu$m, preferably 6 to 25 $\mu$m and a standard deviation of the particle volume distribution to the particle diameter represented by the logarithm of the particle diameter ($\mu$m) in the range of 0.1 to 0.25, preferably 0.1 to 0.2. When the silica particles thus having a narrow particle size distribution and large pores therein are used as a paper-making filler, an excellent opacity-after-printing can be obtained even when the paper sheets are thin and the amount of the filler is not so large.

As a matter of course, the wet grinding and wet classification are not always necessary when the diameter of the obtained particles are in this range.

The silica particles of the present invention have a specific surface area of 30 to 200 $m^2$/g, preferably 60 to 180 $m^2$/g as determined by the mercury porosimetry. When the specific surface area is smaller than 30 $m^2$/g, it is difficult to obtain an oil absorption of 300 ml/100 g or more. On the contrary, when the specific surface area exceeds 200 $m^2$/g, the properties of the silica particles become like those of a gel, the shrinkage by drying is increased and the oil absorption is inclined to be low.

Papers obtained by incorporating the silica particles of the present invention as a filler into a pulp material and making the papers from the resultant mixture have a high opacity, particularly a high opacity-after-printing. A reason therefor is considered to be that since the pore volume in the silica particles is increased to increase the oil absorption, the capacity of inhibiting the ink from the penetration into the paper after the printing is increased.

The silica particles of the present invention are usable as a filler to be dispersed in pulp fibers used as a starting material for paper in any of acid paper making method, neutral paper making method or alkaline paper making method, or as a pigment for surface coating agents.

The silica particles in the form of the slurry produced by the above-described process can be mixed with a starting material for paper and the obtained mixture can be used for making a paper with a wet paper-making machine; or the silica particles produced by the above-described process can be dried and kept in the form of a powder to be dispersed again in water and mixed with the starting material for paper.

The amount of the silica particles used as the filler varies depending on the desired ash content of the paper and is usually 1 to 30% by weight, preferably 1 to 20% by weight.

The pulps used for preparing papers containing the silica particles of the present invention as the filler are known, ordinary paper-making pulps. They include chemical pulps such as sulfite pulps, craft pulps and soda pulps; wood pulps such as semichemical pulps and mechanical pulps; and non-wood pulps such as paper mulbery, paper bush (*Edgeworhia papyrifera*) and hemp. These pulps may be either unbleached pulps or bleached pulps, and either unbeaten pulps or beaten pulps. They may be used either alone or in the form of a mixture of two or more of them.

The silica filler-containing paper of the present invention may contain other fillers than the silica particles of the present invention and also other additives usually used for the paper making such as a sizing agent, defoaming agent, slime-controlling agent, dye, coloring pigment, fluorescent dye, dry strength additive, wet strength additive, drainage aid and retention aid, if necessary.

The surfaces of the papers containing the silica filler of the present invention can be coated with a starch, polyvinyl alcohol, polyacrylamide, surface sizing agent, etc.

The wet paper making machine used in the present invention is suitably selected from well-known, commercial-scale paper making machines such as a cylinder paper machine, inclined former, Fourdrinier machine and twin-wire paper machine depending on the purpose.

As described above, the silica particles of the present invention have a high oil absorption because the pore volume in each particle was increased while the specific surface area thereof was kept so that a serious shrinkage is not caused when the silica particles in the form of a slurry are directly dried, and when the particles are used as the filler in the paper making, a paper having an excellent opacity-after-printing can be obtained.

EXAMPLES

The following Examples will further illustrate the present invention, which by no means limit the scope of the present invention. In the Examples, percentages are given by weight.

Example 1

240 g of commercially available JIS No. 3 aqueous sodium silicate solution (a product of Tokuyama, solid concentration: 30%) was diluted with pure water to 1,000 g. The silica (silicon dioxide) concentration was 72 g/kg. The diluted solution was fed into a two-liter stainless steel beaker, and 17.9 g of anhydrous sodium sulfate was added thereto at 50° C. Then, 180 g of an aqueous magnesium hydroxide dispersion (#200, a product of Konoshima Kagaku Kogyo, solid concentration: 8%) having an average particle diameter controlled at 0.5 $\mu$m with a sand grinder was added as the first particles difficultly soluble in an alkali and soluble in an acid. 54 g (30% based on the whole amount of acid necessitated for neutralizing sodium silicate) of sulfuric acid (concentration: 20%) was continuously added over a period of 12 minutes under stirring with Three-One motor.

After the completion of the addition of sulfuric acid, the temperature was elevated to 90° C. under stirring in a period of 25 minutes. The stirring was conducted at that temperature for 10 minutes to conduct the aging. Then, 126 g of sulfuric acid was continuously added for 23 minutes and the aging was conducted for additional 20 minutes. 110 g of sulfuric acid was continuously added for 15 minutes to dissolve magnesium hydroxide. The pH of the slurry in this step was 5.2.

The slurry containing the reaction product was passed through a 200-mesh sieve to remove the residue. The average particle diameter of the obtained silica particles was 21.3 $\mu$m as determined by the above-described laser method. The slurry passed through the sieve was filtered through a Buchner funnel to obtain silica particles in the form of a cake. A part of the cake was dried at 105° C. overnight, and the oil absorption, specific surface area, pore volume and bulk specific gravity of the particles were determined. The balance was dispersed again in water and stirred to obtain a slurry thereof having a concentration of 8%. This slurry was used as the paper-making filler slurry in the following step.

25 g (absolute dry weight) of a mixed pulp comprising 15% of semi-bleached soft wood kraft pulp, 34% of a thermomechanical pulp (TMP), 11% of mechanical pulp (GP) and 40% of deinked pulp (DIP) obtained from waste newspapers was dispersed in tap water and the dispersion was diluted to a volume of 2 liters to obtain a 1.25% slurry. The filler slurry obtained as described above was added to this slurry in such amounts that the filler content would be 3% based on the absolute dry weight of the pulp. After stirring for 2 minutes, 1%, based on the absolute dry weight of the pulp, of aluminum sulfate [$Al_2(SO_4)_3 \cdot 18H_2O$] was added and the resultant mixture was stirred for 2 minutes. The whole mixture was diluted to 12.5 liters and thoroughly stirred. A paper having an absolute dry weight of 40 g/m$^2$ was made with a square sheeting machine (a product of Tozai Seiki) and dried.

The moisture of the hand-made sheet was controlled in a room having a relative humidity of 65% at 20° C. and the sheet was passed through an experimental machine calender (a product of Kumagai Riki Kogyo) under a linear pressure of 40 kg/cm twice to control the smoothness. Then, the paper quality tests for determining the ISO brightness and opacity and the printing tests were conducted by the following methods to evaluate the paper sheet:

(1) Brightness: The brightness of the paper was determined according to JIS P 8148 (ISO 2470).
(2) Opacity of white paper: The opacity of white paper was determined according to J. TAPPI 53 (ISO 2471).
(3) Opacity after printing: The solid printing was conducted with an offset ink for newspapers and an RI printing tester, and the opacity-after-printing Y (%) was defined by the following formula (1):

$$Y(\%)=A/B\times100$$

wherein A represents the reflectance of the reverse side of a paper after printing, and B represents the reflectance of the reverse side of the paper before printing.

(4) Retention of silica particles in paper:

The ash content (A1) of a paper free of silica particles and the ash content (A2) of a paper containing silica particles were determined according to JIS P 8128, and the yield was calculated according to the formula:

$$[(A2)-(A1)]/(\text{addition rate of silica particles in sheet-making step})$$

Example 2

600 g of a 12% aqueous solution of magnesium hydroxide (controlled at 0.5 $\mu$m) was added to 240 g of an aqueous solution of No. 3 sodium silicate, and the resultant mixture was diluted with pure water to a volume of 1,000 g. 27 g of sulfuric acid and then 153 g thereof were added thereto to conduct the reaction. Then, the reaction and treatment were conducted in the same manner as that of Example 1 except that the amount of sulfuric acid used for dissolving magnesium hydroxide was altered to 550 g. The obtained slurry containing the silica particles was evaluated in the same manner as that of Example 1.

After the completion of the reaction, the pH of the slurry was 4.2, and the average diameter of the obtained particles was 15.6 $\mu$m.

Example 3

The reaction and treatment were conducted in the same manner as those of Example 2 except that the amount of the aqueous magnesium hydroxide solution to be added to the aqueous sodium silicate solution was altered to 240 g, the amounts of sulfuric acid used in the first and the second steps were altered to 63 g and 117 g, respectively, and the amount of sulfuric acid used for dissolving magnesium hydroxide was altered to 220 g. The obtained slurry containing the silica particles was evaluated in the same manner as that of Example 1.

After the completion of the reaction, the pH of the slurry was 4.4, and the average diameter of the obtained particles was 19.7 μm.

Example 4

The reaction and treatment were conducted in the same manner as those of Example 1 except that the particle diameter of magnesium hydroxide was altered to 0.1 μm. The obtained slurry containing the silica particles was evaluated in the same manner as that of Example 1.

After the completion of the reaction, the pH of the slurry was 5.1, and the average diameter of the obtained particles was 18.4 μm.

Example 5

The reaction and treatment were conducted in the same manner as those of Example 1 except that the particle diameter of magnesium hydroxide was altered to 1 μm. The obtained slurry containing the silica particles was evaluated in the same manner as that of Example 1. After the completion of the reaction, the pH of the slurry was 5.0, and the average diameter of the obtained particles was 23.3 μm.

Comparative Example 1

The reaction and treatment were conducted in the same manner as those of Example 1 except that sulfuric acid for dissolving magnesium hydroxide was not added. The obtained slurry containing the filler was evaluated in the same manner as that of Example 1.

After the completion of the reaction, the pH of the slurry was 9.3, and the average diameter of the obtained particles was 20.8 μm.

Comparative Example 2

The reaction and treatment were conducted in the same manner as those of Example 1 except that magnesium hydroxide was not added, the amount of sulfuric acid added at the first time was 72 g and sulfuric acid for dissolving magnesium hydroxide was not added. The obtained slurry containing the filler was evaluated in the same manner as that of Example 1.

After the completion of the reaction, the pH of the slurry was 4.3, and the average diameter of the obtained particles was 19.9 μm.

Referential Example 1

For comparison, hand-made sheets were made in the same manner as that of Example 1 except that the filler was not used, and the products were evaluated.

The results of the Examples, Comparative Examples and Referential Examples are shown in following Table 1.

TABLE 1

| | Oil absorption ml/100 g | Specific surface area $m^2/g$ | Pore volume cc/g | Brightness % | Opacity (%) White paper | Opacity (%) After printing |
|---|---|---|---|---|---|---|
| Ex. 1 | 400 | 97 | 5.2 | 51.6 | 90.1 | 86.4 |
| Ex. 2 | 350 | 83 | 4.3 | 51.5 | 90.3 | 86 |
| Ex. 3 | 450 | 125 | 5.5 | 51.8 | 90.4 | 86.6 |
| Ex. 4 | 400 | 111 | 4.9 | 51.5 | 90.1 | 86.4 |
| Ex. 5 | 370 | 104 | 4.6 | 51.7 | 90.1 | 86.2 |
| Comp. Ex. 1 | 230 | 79 | 3 | 52 | 90.6 | 84.7 |
| Comp. Ex. 1 | 250 | 160 | 3.2 | 51.1 | 88.9 | 84.9 |
| Ref. Ex. 1 | — | — | — | 50.6 | 88.5 | 82.3 |

It is apparent from Table 1 that the silica particles obtained by the present invention are capable of imparting high brightness and opacity, particularly an extremely excellent opacity-after-printing, to the papers containing them (Examples 1 to 5). On the contrary, when the particles difficultly soluble in alkalis and soluble in acids are not used at all (Comparative Example 2) or when no filler is used (Referential Example 1), the brightness, opacity of white paper and opacity-after-printing are poor disadvantageously.

On the other hand, when the particles difficultly soluble in alkalis and soluble in acids are not dissolved (Comparative Example 1), the opacity-after-printing cannot be sufficiently improved because the pore volume in the silica particles is small, though the brightness and opacity of white paper can be improved by the effect of these particles difficultly soluble or insoluble in alkalis and soluble in acids and included in the silica particles.

Example 6

240 g of a commercially available JIS No. 3 aqueous sodium silicate solution (a product of Tokuyama, solid concentration: 30%) was diluted with pure water to 820 g. The silica (silicon dioxide) concentration was 72 g/kg. The diluted solution was fed into a two-liter stainless steel beaker, and 17.9 g of anhydrous sodium sulfate and 180 g of an aqueous magnesium hydroxide dispersion (#200, a product of Kamishima Kagaku Kogyo, solid concentration: 8%) having an average particle diameter controlled at 0.5 μm with a sand grinder were added at 50° C. 63 g (35% based on the whole amount of acid necessitated for neutralizing sodium silicate) of sulfuric acid (concentration: 20%) was continuously added over a period of 13 minutes under stirring with Three-One motor. After the completion of the addition of sulfuric acid, the temperature was elevated to 90° C. under stirring during 25 minutes. The stirring was conducted at that temperature for 20 minutes to conduct the aging. Then, 117 g of sulfuric acid was continuously added for 23 minutes and the aging was conducted for additional 20 minutes. 110 g of sulfuric acid was continuously added for 15 minutes to dissolve magnesium hydroxide. The pH of the slurry in this step was 4.9.

The slurry containing the reaction product was passed through a 200-mesh sieve to remove the residue. The average particle diameter of the obtained silica particles was 21.3 μm as determined by the above-described laser method. The filler slurry passed through the sieve was filtered through a Buchner funnel to obtain the filler in the form of a cake. A part of the cake was dried at 105° C. overnight, and the oil absorption, specific surface area, pore volume and bulk specific gravity of the product were determined. The balance was dispersed again in water and stirred to obtain a slurry thereof having a concentration controlled at 8%.

25 g (absolute dry weight) of a mixed pulp comprising 15% of bleached coniferous wood kraft pulp, 34% of a thermomechanical pulp (TMP), 11% of mechanical pulp (GP) and 40% of deinked pulp (DIP) obtained from waste newspaper was dispersed in tap water and the dispersion was diluted to a volume of two liters to obtain a 1.25% slurry. The filler slurry obtained as described above was added to this slurry in such amounts that the filler content would be 3% based on the absolute dry weight of the pulp. After stirring for 2 minutes, 1%, based on the absolute dry weight of the pulp, of aluminum sulfate $[Al_2(SO_4)_3 \cdot 18H_2O]$ was added, and the resultant mixture was stirred for 2 minutes and then diluted to 12.5 liters. After the thorough stirring, a paper having an absolute dry weight of 40 g/m² was made with a square sheeting machine and dried.

The moisture of the hand-made sheet was controlled in a room having a relative humidity of 65% at 20° C. and the sheet was passed through an experimental machine calender under a linear pressure of 40 kg/cm twice to control the smoothness. Then, the printing tests were conducted by the above-described methods to evaluate the opacity-after-printing.

Example 7

The reactions and treatments were conducted in the same manner as that of Example 1 except that 300 g of an aqueous magnesium hydroxide solution (concentration: 12%) having a particle diameter controlled at 0.5 μm was added to 240 g of an aqueous solution of No. 3 sodium silicate, that the resultant mixture was further diluted to 1,000 g with pure water, that 45 g of sulfuric acid was added first and then 135 g thereof was added, and that the amount of sulfuric acid used for dissolving magnesium hydroxide was 275 g. The obtained filler slurry was evaluated in the same manner as that of Example 1.

After the completion of the reaction, the pH of the slurry was 4.5 and the average diameter of the obtained particles was 15.6 μm.

Example 8

The reactions and treatments were conducted in the same manner as that of Example 6 except that the amount of the aqueous magnesium hydroxide solution to be added to the aqueous solution of sodium silicate was altered to 180 g, that 54 g of sulfuric acid was added first and then 126 g thereof was added, and that the amount of sulfuric acid used for dissolving magnesium hydroxide was 165 g. The obtained filler slurry was evaluated in the same manner as that of Example 6.

After the completion of the reaction, the pH of the slurry was 5.3 and the average diameter of the obtained particles was 19.7 μm.

Comparative Example 3

The reactions and treatments were conducted in the same manner as that of Example 6 except that magnesium hydroxide was not added, the amount of sulfuric acid added first was 72 g, and that sulfuric acid for dissolving magnesium hydroxide was not added. The obtained filler slurry was evaluated in the same manner as that of Example 6.

After the completion of the reaction, the pH of the slurry was 4.3 and the average diameter of the obtained particles was 19.9 μm.

TABLE 2

|  | Oil absorption ml/100 g | Bulk specific gravity g/ml | Pore volume cc/g $\leq 10^5$ Å | Pore volume cc/g $6000\sim 8 \times 10^4$ Å | Pore volume cc/g $200\sim 1000$ Å | Opacity after printing % | Specific surface area m²/g |
|---|---|---|---|---|---|---|---|
| Ex. 6 | 450 | 0.076 | 5.2 | 3.26 | 1.52 | 86.4 | 115 |
| Ex. 7 | 350 | 0.082 | 4.9 | 2.33 | 1.71 | 86.2 | 135 |
| Ex. 8 | 430 | 0.066 | 5.5 | 3.64 | 1.31 | 86.6 | 106 |
| Comp. Ex. 3 | 250 | 0.115 | 3.3 | 1.53 | 1.56 | 84.9 | 164 |

It is apparent from Table 2 that the pore diameters of most of the silica particles obtained by the present invention are within the predetermined range and, therefore, a paper having a remarkably high opacity-after-printing can be obtained by using these particles (Examples 6 to 8).

On the other hand, when the volume of the pores having diameters within the predetermined range is small (Comparative Example 3), the opacity-after-printing is poor unfavorably.

Example 9
Preparation of Silica Particles 480 g of a commercially available aqueous solution of JIS No. 3 sodium silicate (a product of Tokuyama, solid concentration: 30%) was diluted with water to a volume of 2,000 g. Silicon dioxide (silica) concentration was controlled at 72 g/kg. They were fed into a 5-liter stainless steel beaker. 36 g of anhydrous sodium sulfate was added thereto. The temperature of the aqueous solution was adjusted to 50° C., and then 350 g of an aqueous dispersion (solid concentration; 8%) of magnesium hydroxide (a product of Kamishima Kagaku Kogyo; #200) having an average particle diameter controlled at 0.5 μm with a sand grinder was added thereto. 108 g (30% based on the whole amount of sulfuric acid necessitated for neutralizing sodium silicate) of sulfuric acid (20%) was continuously added for a period of 12 minutes under stirring. After the completion of the addition of sulfuric acid, the temperature was elevated to 90° C. under stirring in a period of 25 minutes and then the aging was conducted at that temperature for 10 minutes. The remaining sulfuric acid (252 g, concentration: 20%) was continuously added for 23 minutes. Then, the aging was conducted for 20 minutes at that temperature.

220 g of sulfuric acid (concentration: 20%) was continuously added thereto for 15 minutes to dissolve magnesium hydroxide. The pH of the slurry was 5.2.

The obtained slurry was filtered, the filter cake was washed and the average particle diameter and the standard deviation of the silica particles thus obtained were determined to obtain 20.8 μm and 0.18, respectively. A papermaking slurry having a solid concentration of 8% was prepared from the silica particles thus obtained.
Method of Making Paper 3% (in terms of the solid) (based on the absolute dry weight of mixed pulp) of the silica particle slurry was added to a mixed pulp slurry (pulp concentration: 1.2%) comprising 15% of bleached coniferous wood kraft pulp, 35% of a thermomechanical pulp, 10% of groundwood pulp and 40% of deinked pulp obtained from waste newspapers. After stirring for 2 minutes, 1% of aluminum sulfate was added thereto and the obtained mixture was stirred for 2 minutes. The slurry thus obtained was diluted to a solid concentration of 0.5% and used as a stock.

Sheets having an air-dried basis weight of 43 g/m² were prepared from the stock with an experimental square sheeting machine (a product of Tozai Seiki). After cooling, the moisture of the sheets was controlled in a room having a relative humidity of 65% at 20° C. for 24 hours and the sheets were passed through an experimental machine calender (a product of Kumagai Riki Kogyo) under a linear pressure of 40 kg/cm twice to control the smoothness.

Example 10

Silica particles were prepared in the same manner as that of Example 9 except that the amounts of the aqueous magnesium hydroxide dispersion and sulfuric acid (concentration: 20%) for dissolving magnesium hydroxide were altered to 180 and 110 g, respectively, and paper sheets were made therefrom. The average particle diameter and standard deviation of the obtained silica particles were 26.8 μm and 0.24, respectively. The obtained paper sheets were evaluated in the same manner as that of Example 9.

Example 11

Silica particles were prepared in the same manner as that of Example 9 except that 72 g (20% based on the whole amount) of sulfuric acid was used first and then 288 g thereof was used, and paper sheets were made therefrom. The average particle diameter and standard deviation of the obtained silica particles were 10.2 μm and 0.14, respectively. The obtained paper sheets were evaluated in the same manner as that of Example 9.

Example 12

The silica particle slurry (solid concentration: 8%) obtained in Example 9 was treated with a sand grinder (SL-1/2G; a product of AIMEX) to obtain silica particles having an average particle diameter of 12.2 μm. The silica particles had a standard deviation of 0.19. The average particle diameter was changed, but the standard deviation were not so different from each other.

The same procedure as that of Example 9 was repeated except that the silica particles thus obtained were used as the filler.

Example 13

Hydrous silicic acid was prepared in the same manner as that of Example 9 except that the amounts of the aqueous magnesium hydroxide dispersion and sulfuric acid (concentration: 20%) for dissolving magnesium hydroxide were altered to 600 g and 380 g, respectively, and paper sheets were prepared by using the product. The average particle diameter and standard deviation of the obtained hydrous silicic acid were 15.8 μm and 0.203, respectively. The obtained paper sheets were evaluated in the same manner as in Example 9.

Comparative Example 4
Preparation of Slica Particles 480 g of a commercially available aqueous solution of JIS No. 3 sodium silicate (a product of Tokuyama, solid concentration: 30%) was diluted with water to a volume of 2,000 g. Silicon dioxide (silica) concentration was controlled at 72 g/kg. They were fed into a 5-liter stainless steel beaker. 36 g of anhydrous sodium sulfate was added thereto. The temperature of the aqueous solution was adjusted to 50° C. 144 g (40% based on the whole amount of sulfuric acid necessitated for neutralizing sodium silicate) of sulfuric acid (20%) was continuously added over a period of 12 minutes under stirring. After the completion of the addition of sulfuric acid, the temperature was elevated to 90° C. under stirring for a period of 25 minutes and then the aging was conducted at that temperature for 10 minutes. The remaining sulfuric acid (216 g, concentration: 20%) was continuously added for 23 minutes. Then, the aging was conducted for 20 minutes at that temperature. The pH of the slurry was 5.2 (slurry A).

The slurry A was classified with a 200-mesh sieve. The residue (remaining rate: 22%) on the sieve was ground with a sand grinder and mixed with the particles which had passed through the sieve. The obtained mixture was filtered and the filter cake was washed. The average particle diameter and standard deviation of the obtained silica particles were determined by the laser method to be 25.8 μm and 0.33, respectively. A paper-making slurry having a solid concentration of 8% was prepared from the silica particles.

Paper sheets were prepared in the same manner as that of Example 9 except that the silica particles obtained as described above were used as the filler. The obtained paper sheets were evaluated in the same manner as in Example 9.

Comparative Example 5

The silica particle slurry (solid concentration: 8%) obtained in Comparative Example 4 was treated with a sand grinder (SL-1/2G; a product of AIMEX) to obtain silica particles having an average particle diameter of 11.8 μm. The silica particles had a standard deviation of 0.35. The average particle diameter was reduced by the grinding, and the range of the distribution was slightly widened. The same procedure as that of Example 9 was repeated except that the silica particles thus obtained were used as the filler. The obtained paper sheets were evaluated in the same manner as that of Example 9.

Referential Example 2

Paper sheets were made in the same manner as that of Example 9 except that the filler was not used. The obtained paper sheets were evaluated in the same manner as that of Example 9. The results were employed as the standards of the evaluation of those obtained in Examples and Comparative Examples.

The results of the Examples and Referential Example 2 are shown in Table 3.

TABLE 3

| | Average particle diameter μm | Standard deviation % | Retention of filler % | Brightness %* | Opacity %* | Opacity after printing %* |
|---|---|---|---|---|---|---|
| Ex. 9 | 20.8 | 0.18 | 40.1 | +1.4 | +2.0 | +3.7 |
| Ex. 10 | 26.8 | 0.24 | 43.6 | +1.4 | +2.0 | +3.3 |
| Ex. 11 | 10.2 | 0.14 | 32.8 | +1.5 | +1.8 | +2.8 |
| Ex. 12 | 12.2 | 0.19 | 33.4 | +1.5 | +1.9 | +2.9 |
| Ex. 13 | 15.8 | 0.20 | 35.8 | +1.5 | +2.0 | +3.0 |
| Comp. Ex. 4 | 25.8 | 0.33 | 35.2 | +1.4 | +2.0 | +2.4 |
| Comp. Ex. 5 | 11.8 | 0.35 | 26.7 | +1.5 | +1.7 | +2.0 |
| Ref. Ex. 2 | — | — | — | standard | standard | standard |

*An increase as compared with Referential Example 2

It is apparent from Table 3 that by narrowing the particle size distribution of the silica particles, the retention of the silica particles in the paper is improved, and the paper sheets excellent in the opacity, particularly opacity-after-printing, can be obtained (Examples 9 to 13). On the other hand, when the characteristic value (standard deviation) of the silica particles is not within the range of the present invention (Comparative Examples 4 and 5), even though the particle diameter levels are the same, the retention of the silica particles in the paper is lower and the degree of the increase in the opacity-after-printing is lower as compared with those obtained when the particle size distribution is narrow, while the effect of improving the opacity is obtained to some extent.

Effect of the Invention

As described above, silica particles having a narrow particle size distribution and a high porosity can be easily and efficiently produced from inexpensive starting materials such as sodium silicate according to the present invention. When these silica particles are used as a filler in the paper making, paper sheets having excellent brightness, opacity and opacity-after-printing can be obtained.

What is claimed is:

1. A process for producing a filler-containing paper, comprising adding a slurry of silica particles to a pulp slurry and using the resultant slurry for making a sheet of paper, said silica particles having an average diameter of 5 to 30 $\mu$m as determined by laser method and a standard deviation of 0.10 to 0.25 in respect of a particle volume distribution to a particle diameter ($\mu$m) represented by logarithm and a cumulative volume of 4.0 to 6.0 cc/g for pores having a diameter of $10^5$ Å or less, that of at least 2.0 cc/g for pores having a diameter of 6,000 to $8\times10^4$ Å, that of at least 1.0 cc/g for pores having a diameter of 200 to 2,000 Å, an oil absorption of 300 to 500 ml/100 g, and a bulk specific gravity of 0.1 g/ml or less.

2. Silica particles having an average diameter of 5 to 30 $\mu$m, a cumulative volume of 4.0 to 6.0 cc/g for pores having a diameter of $10^5$ Å or less, that of at least 2.0 cc/g for pores having a diameter of 6,000 to $8\times10^4$ Å, that of at least 1.0 cc/g for pores having a diameter of 200 to 2,000 Å, an oil absorption of 300 to 500 ml/100 g, and a bulk specific gravity of 0.1 g/ml or less.

3. The silica particles of claim 2, having a specific surface area of 30 to 200 m$^2$/g.

4. A filler-containing paper containing the silica particles of claim 2 as the filler.

5. The silica particles of claim 2, wherein the cumulative volume for pores having a diameter of $10^5$ Å or less is 4.0 to 5.5 cc/g.

6. The silica particles of claim 2, wherein the cumulative volume for pores having a diameter of 200–2000 Å is 1.0 to 2.0 cc/g.

7. The silica particles of claim 2, wherein the oil absorption is 350 to 500 ml/100 g.

8. The silica particles of claim 2, wherein the bulk specific gravity of the silica particles is 0.09 g/ml or less.

9. The silica particles of claim 2, wherein the bulk specific gravity of the silica particles is 0.06 to 0.09 g/ml.

10. The silica particles of claim 2, wherein the particles have an average particle diameter of 5 to 30 $\mu$m.

11. The silica particles of claim 2, wherein the particles have an average particle diameter of 8 to 25 $\mu$m.

12. The silica particles of claim 2, wherein the particles have a particle size distribution having a standard deviation represented by a logarithm in the range of 0.1 to 0.2.

13. The silica particles of claim 2, wherein the silica particles have a specific surface area of 60 to 180 m$^2$/g.

* * * * *